No. 795,679. PATENTED JULY 25, 1905.
M. BAMBERGER, F. BÖCK & F. WANZ.
PROCESS OF REGENERATING EXHALED AIR FOR RESPIRATION PURPOSES.
APPLICATION FILED JULY 13, 1904.
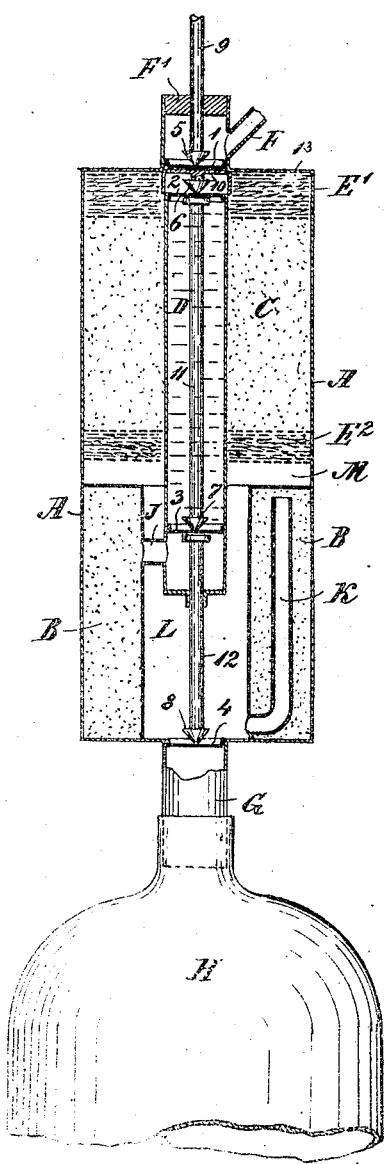

UNITED STATES PATENT OFFICE.

MAX BAMBERGER, FRIEDRICH BÖCK, AND FRIEDRICH WANZ, OF VIENNA, AUSTRIA-HUNGARY.

PROCESS OF REGENERATING EXHALED AIR FOR RESPIRATION PURPOSES.

No. 795,679. Specification of Letters Patent. Patented July 25, 1905.

Application filed July 13, 1904. Serial No. 216,434.

*To all whom it may concern:*

Be it known that we, MAX BAMBERGER, professor at the Polytechnical University of Vienna, Austria-Hungary, FRIEDRICH BÖCK, assistant professor at the Polytechnical University of Vienna, Austria-Hungary, and FRIEDRICH WANZ, engineer, subjects of the Emperor of Austria-Hungary, residing at Vienna, in the Empire of Austria-Hungary, have invented certain new and useful Improvements in Processes of Regenerating Exhaled Air for Respiration Purposes; and we do hereby declare the following to be a full, clear, and exact description of the invention, such as will enable others skilled in the art to which it appertains to make and use the same.

Our invention relates to a process of regenerating exhaled air for respiration purposes.

In our process exhaled air, which besides nitrogen and a reduced quantity of oxygen contains vapor of water and carbonic dioxid, (the latter two forming the products of respiration,) is passed through a porous layer of alkali peroxid, such as potassium tetroxid ($K_2O_4$) or sodium bioxid ($Na_2O_2$) or potassium sodium peroxid ($KNaO_3$). While the exhaled air passes through the alkali peroxid, thus coming into intimate contact therewith, a reaction takes place in which the alkali peroxid is reduced and gives off oxygen, which mingles with the oxygen and nitrogen of the exhaled air and escapes together with them, and, on the other hand, the vapor of water and the carbonic dioxid combine with the alkali oxid resulting from such reduction to form alkali hydroxid and alkali carbonate, respectively, as is shown by the following chemical equations:

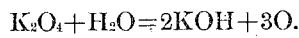
$K_2O_4 + H_2O = 2KOH + 3O.$

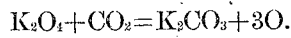
$K_2O_4 + CO_2 = K_2CO_3 + 3O.$

$KNaO_3 + H_2O = KOH + NaOH + 2O.$

$2KNaO_3 + 2CO_2 = K_2CO_3 + Na_2CO_3 + 4O.$

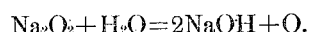
$Na_2O_2 + H_2O = 2NaOH + O.$

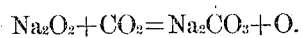
$Na_2O_2 + CO_2 = Na_2CO_3 + O.$

The reaction is so energetic that the materials are heated to a temperature which will not permit the alkali carbonate that may be formed by the action of carbonic dioxid on alkali hydroxid to retain any water. Therefore the action of carbonic dioxid contained in the exhaled air on the alkali hydroxid formed by the action of the water-vapors of the exhaled air on the alkali peroxid will result in setting free a corresponding amount of water, as will be seen from the following equation:

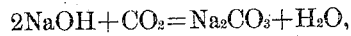
$$2NaOH + CO_2 = Na_2CO_3 + H_2O,$$

which water will in turn decompose a corresponding quantity of alkali peroxid, producing oxygen and alkali hydroxid, as above explained.

It will be seen that the carbonic dioxid that was contained in the exhaled air, as also the vapor of water, is entirely absorbed by or combined with alkali oxid, while, on the other hand, the oxygen evolved during the reaction is added to the nitrogen and oxygen of the exhaled air. The amount of oxygen thus added depends on the nature of the alkali peroxid used. In the case of potassium tetroxid it is notably greater and in the case of potassium sodium peroxid slightly greater, but in the case of sodium peroxid smaller than the amount of oxygen that was contained in the carbonic dioxid and the vapor of water of the exhaled air. Therefore by mixing the alkali peroxids above named in suitable proportions we can so arrange that the amount of oxygen added to the exhaled air by the above reactions is exactly the same that was contained in the carbonic dioxid and vapor of water of the exhaled air. The latter will then after having passed through the alkali peroxid be entirely free from carbonic dioxid and vapor of water and will contain nitrogen and oxygen in exactly the same proportions as the natural atmospheric air, or, in other words, the exhaled air will be regenerated or transformed into atmospheric air free from any contamination. The air thus regenerated may be inhaled again directly. In many cases it will be found advantageous to use sodium peroxid alone, which, as above set forth, does not add to the exhaled air the total amount of oxygen required, and to mix the air after having passed through the sodium peroxid and before being inhaled again with oxygen obtained from a separate source.

In any case this process is self-regulating in so far as the amount of oxygen added exactly corresponds to the amount of carbonic dioxid and vapor of water contained in the air exhaled irrespective of the irregularities that may occur.

In the accompanying drawing an apparatus for regenerating exhaled air in the manner above described is shown by way of example, the view shown being a vertical central section.

A is a receptacle preferably cylindrical in shape. D is a central tube in the same filled with water.

B C are annular chambers in the receptacle A.

E' E² are filters tightly closing the chamber C at both ends and consisting of asbestos, glass-wool, or other refractory filtering material, held in position between partitions of perforated sheet metal or wire-gauze.

F is a tube leading into a dome F' on the top end of the receptacle and adapted to be connected with a mask or other suitable respiratory apparatus.

H is a bag of suitable air-tight material connected by a short tube G to the central space L in the chamber B.

J is a short tube connecting the water-tube D with the interior of the chamber B.

K is a pipe connecting the space L with the interior of the chamber B.

1 2 3 4 are partitions of sheet-lead or other similar suitable material, the partition 1 separating the dome from the filter E', the partition 2 closing the top end of the tube D, the partition 3 separating the lower end of the tube D from the tube J, and the partition 4 separating the central space L from the tube G.

5 6 7 8 are perforating cones at the lower ends of rods 9, 10, 11, and 12, respectively, and resting against the upper sides of the partitions 1, 2, 3, and 4, respectively. The said rods are suitably guided, so that they are always in alinement. The upper end of the rod 9 extends out of the dome F' and is provided with any suitable means for depressing the same, while the upper ends of rods 11 and 12 rest against the lower sides of partitions 2 and 3, respectively.

13 is a cap adapted to snugly fit the top end of the tube D and held against the lower side of the partition 1 by the upper end of rod 10.

M is a free space between the filter E² and the top of chamber B.

The chamber C is charged with alkali peroxid, preferably sodium peroxid or a mixture of sodium peroxid and potassium tetroxid, and also chamber B is charged with alkali peroxid, and tube D is filled with water. The partitions 1 2 3 4 and the rods 9 10 11 12 are brought into the position shown, the said partitions being soldered or otherwise secured in place, so that they make an air-tight joint and prevent the alkali peroxid in chambers B and C from coming into contact with air or moisture and the water in tube D from evaporating. The apparatus can then be kept ready for use for an indefinite length of time.

When the apparatus has to be used, the tube F is connected with the mask or respiration apparatus of the user, such mask or respiration apparatus constituting the breathing-space, and then the rod 9 is depressed, whereby also the rods 10, 11, and 12 are forced downward. The partitions 1, 2, 3, and 4 are perforated simultaneously. The water from the tube D flows through the hole in the partition 3 into the chamber B, where it reacts on the alkali peroxid contained therein, so that oxygen is evolved, which escapes through the pipe K, the hole in the partition 4, and tube G into the bag H, it being prevented from escaping through the pipe D by the cap 13 closing the top end of the same. The air exhaled by the user passes through the tube F and the perforation in the partition 1 into the filter E' and thence through the chamber C, charged with alkali peroxid, and the filter E² into the space M. In the chamber C the above-described reaction between the carbonic dioxid and vapor of water contained in the exhaled air and the alkali peroxid takes place, whereby the exhaled air is enriched in oxygen. The oxygen contained in the bag H serves to compensate for any irregularities in the reaction and breathing and to furnish any oxygen required beyond that supplied by the reaction taking place in the chamber C. On inhaling again, the previously-exhaled air, enriched in oxygen, and thus regenerated, goes back through filter E², chamber C, and filter E' to the tube F, the last traces of vapor of water and carbonic dioxid being thereby removed with absolute certainty. The filters prevent any particles of alkali peroxid or hydroxid or carbonate from entering into the tube F.

By the process just described a person can remain and breathe freely in any locality filled with obnoxious or poisonous gases as long as alkali peroxid is contained in the chamber C; but when the alkali peroxid is exhausted the products of reaction (alkali carbonate and a small quantity of alkali hydroxid) have to be removed from the chamber C, and this chamber has to be filled again with alkali peroxid. This will, however, be possible only under exceptional conditions. In the majority of cases the receptacle A will be removed and thrown away and replaced by a fresh one after the contents of the chamber C are exhausted.

The apparatus for carrying out our process is very cheap and simple in construction and very efficient and reliable in operation, (there being no valves at all in the apparatus,) and besides it can be made so light and of so small a volume that it can be carried by a person without interfering with his free movements. Indeed, an apparatus of about three-and-one-half pounds in weight will furnish an amount of oxygen sufficient for forty minutes' breathing. Therefore this apparatus is particularly useful for miners, firemen, and in similar cases.

We are aware that it has been proposed to regenerate vitiated air by causing predetermined quantities of alkali peroxid to drop successively into water contained in a closed chamber and by causing the vitiated air to pass through such chamber, so that it mixes with the oxygen there produced, the carbonic dioxid contained in such vitiated air being absorbed by the caustic-alkali solution formed by the reaction between the alkali peroxid and the water. In contradistinction thereto we cause the exhaled air itself to pass through the alkali peroxid, so as to cause the vapors of water and the carbonic dioxid contained therein to act directly upon the alkali peroxid and so to produce the oxygen required for regenerating the exhaled air, totally or in great part by this exhaled air itself. In other words, we utilize for regenerating the exhaled air its vitiating elements themselves, thus not only insuring that these vitiating elements are totally removed with absolute certainty and that an amount of oxygen is always produced by the reaction, which exactly corresponds to the quantity of carbonic dioxid and vapor of water contained in the exhaled air, thereby rendering the process self-regulating, but also that the water required for producing oxygen in the case above referred to is dispensed with and all irregularities in the production of oxygen and the regeneration of the vitiated air connected with the introduction of successive portions of alkali peroxid into the water are entirely avoided.

We claim—

1. A process for regenerating exhaled air for respiration purposes consisting in causing the exhaled air to pass through a porous layer of alkali peroxid or peroxids and then to return to the breathing-space again, substantially as described.

2. A process for regenerating exhaled air for respiration purposes consisting in causing the exhaled air to pass through a porous layer of alkali peroxid or peroxids and then to return to the breathing-space through the same porous layer of alkali peroxid or peroxids, substantially as described.

3. A process for regenerating exhaled air for respiration purposes consisting in causing the exhaled air to pass through a porous layer of alkali peroxid or peroxids mixing it with oxygen derived from a separate source and then causing the mixture to return to the breathing-space through the same porous layer of alkali peroxid or peroxids, substantially as described.

In testimony whereof we affix our signatures in presence of two witnesses.

MAX BAMBERGER.
FRIEDRICH BÖCK.
FRIEDRICH WANZ.

Witnesses:
GEORGES KERCH,
ALVESTO S. HOGUE.